US006232909B1

(12) United States Patent
Masciulli

(10) Patent No.: US 6,232,909 B1
(45) Date of Patent: May 15, 2001

(54) COMMUNICATION NETWORK OPTIMIZATION TOOL

(75) Inventor: Michael Masciulli, East Brunswick, NJ (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 09/398,957

(22) Filed: Sep. 17, 1999

(51) Int. Cl.$^7$ ........................................................ G01S 7/537
(52) U.S. Cl. ................ 342/13; 342/16; 342/165; 342/173; 342/175; 342/195; 342/450; 455/84; 375/130; 375/140; 375/146; 375/147; 375/219; 375/295; 375/316
(58) Field of Search ..................... 375/130–153, 375/219, 295, 316; 342/13–20, 165–175, 189–197, 450–465; 455/84

(56) References Cited

U.S. PATENT DOCUMENTS 5,363,103 * 11/1994 Inkol ....................................... 342/13
6,043,770 * 3/2000 Garcia et al. ........................... 342/13

* cited by examiner

Primary Examiner—Bernarr E. Gregory
(74) Attorney, Agent, or Firm—Paul S. Clohan, Jr.

(57) ABSTRACT

This invention identifies a process for determining the performance of radio frequency (RF) links in the Army's Enhanced Position Reporting System (EPLRS) with a high level of statistical confidence. The method includes determining a statistical difference between a mean propagation loss for an EPLRS RF link based on measured RF propagation loss and TIREM calculated RF propagation loss, establishing a margin of error based on said statistical difference to arrive at a confidence level of the RF propagation loss, determining a computed S/N based on the confidence level, for the benign and jamming case, and determining a PCOM value based on the computed S/N value.

2 Claims, 4 Drawing Sheets

Calculate PCOM From S/N Value, For Broadband Jamming Case

Figure 1, continued
Calculate PCOM From S/N Value, For Non-Jamming Case (cont)
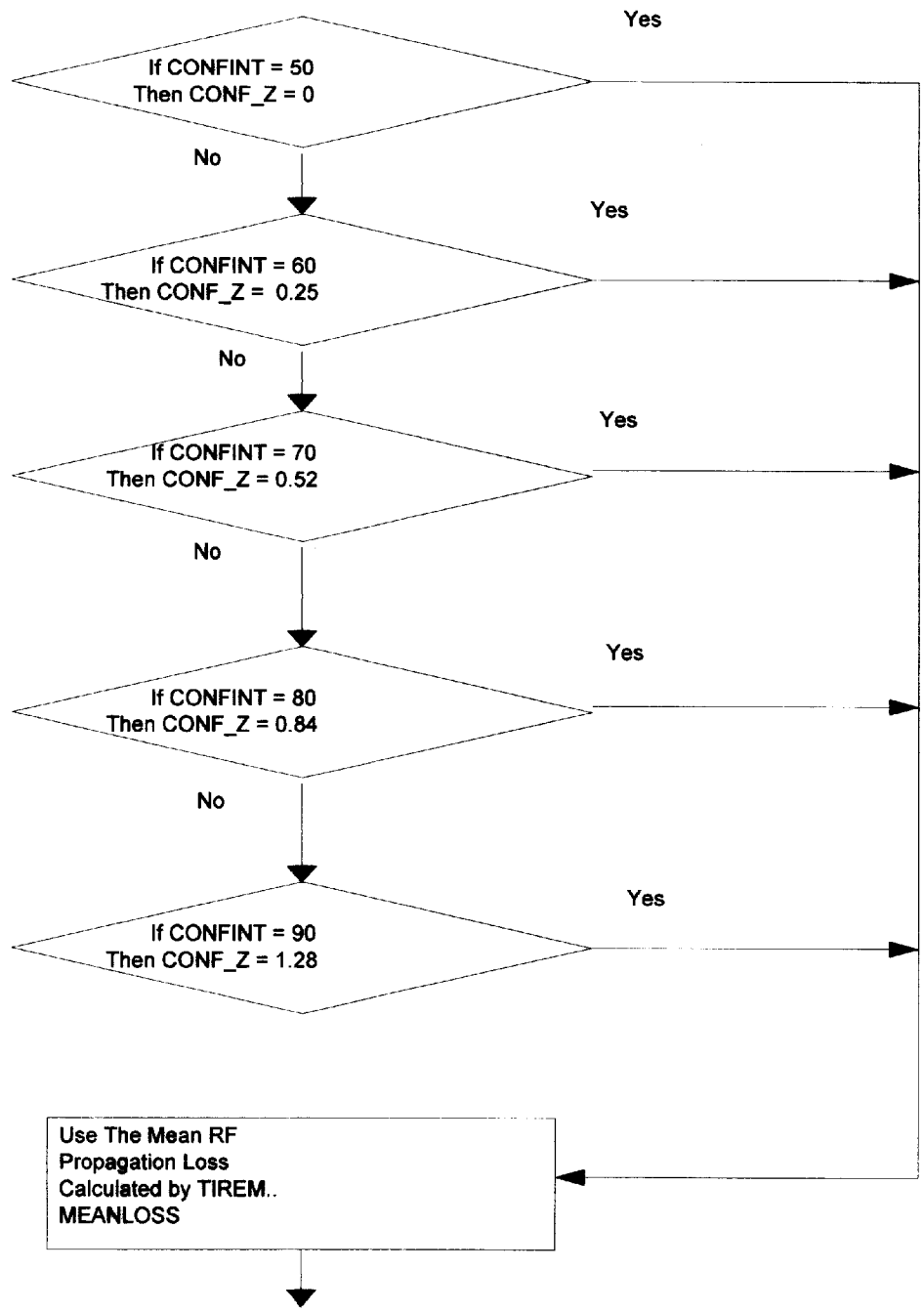

Figure 1, continued
Calculate PCOM From S/N Value, For Non-Jamming Case
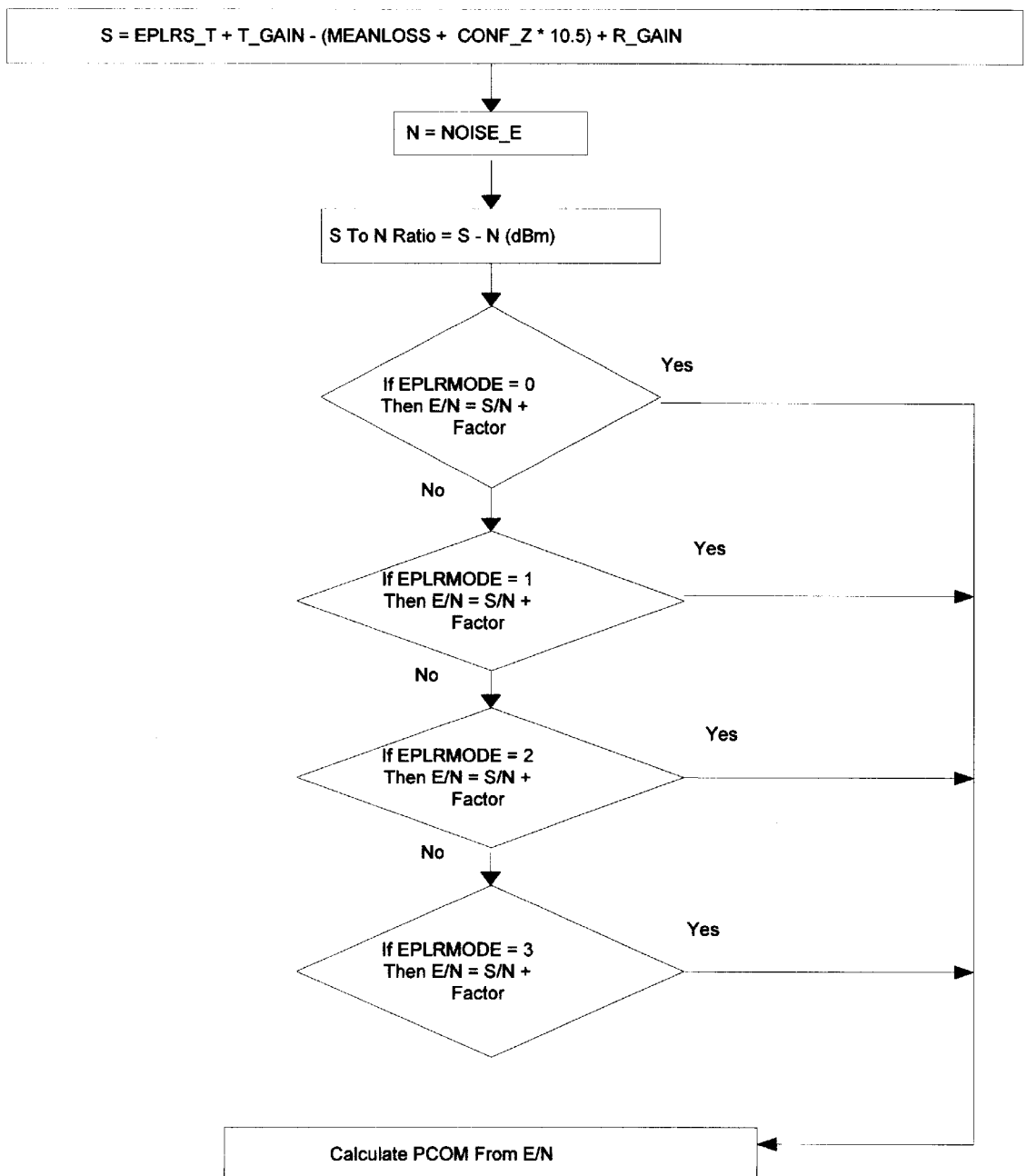

Calculate PCOM From S/N Value, For Broadband Jamming Case

COMMUNICATION NETWORK OPTIMIZATION TOOL

BACKGROUND OF THE INVENTION

1. Field of Invention

This invention pertains to digital radio frequency (RF) links, particularly digital RF links used on the modern battlefield.

2. Purpose of the Invention

This invention identifies a process for determining the performance of radio frequency (RF) links in the Army's Enhanced Position Location Reporting System (EPLRS) with a high level of statistical confidence. EPLRS is an integrated communications system that provides near real-time data communications, position/location, navigation, identification and reporting information on the modem battlefield. The system, which may include 300–1500 terminals in a division with up to five NCS's, utilizes spread spectrum technology and frequency hopping error detection and correction and is capable of supporting multiple communications channel operations. Understanding RF link performance is critical to effective use of EPLRS. RF link performance is broadly characterized by the ratio of desired EPLRS received signal to noise within the communication channel (the S/N ratio). The present EPLRS capacity model simulations use various parameters to characterize the desired signals, propagation characteristics and communication and battlefield scenarios. While the signal models work quite well under a number of scenarios, the nature of the problem is such that the models are not able to account for many situations that can and do occur on the battlefield. The present invention uses statistical methods to account for the variability associated with certain parameters used to compute the EPLRS RF link performance. For example, when a building is constructed, engineers design it with a certain amount of margin based on statistics such as steel beam tensile strength and wind conditions which stress these steel structures on any given day. In order to avoid over design and under design, statistics may be used as a tool to provide margins to achieve a quantitative level of confidence. In the case of a communications system such as EPLRS, the RF noise background and RF propagation loss are two parameters that are hard to model with great accuracy. Statistical methods can provide a quantitative level of confidence, based on measured data and certain numerical assumptions.

The key parameter used to measure a single EPLRS RF link performance is the Probability of Communication (PCOM) which is a function of S/N. PCOM is the probability of a single EPLRS pulse being successfully received over a single link in one direction. The EPLRS system employs four modes of operation which provide various levels of anti-jam capability. These algorithms provide a Probability of Communication (PCOM) for each EPLRS RF link based on mode of operation and random Gaussian (white) noise in the RF noise environment.

The method of this invention can be used to generate an input file required by Communication Electronics Command (CECOM) EPLRS Capacity Model version 6.2. This tool can also be used to analyze all possible permutations of RF links supporting an EPLRS network with and without broadband (gaussian noise) jamming.

The EPLRS PCOM analysis tool can provide a user with a quantitative level of confidence for predicting EPLRS RF link performance. The Army currently uses a model called the "Terrain-Integrated Rough-Model" (TIREM) to calculate a mean RF propagation loss value given a terrain profile along the RF link path. For background, see DOD Electromagnetic Compatibility Analysis Center (ECAC) document ECAC-HDBK-93-076, titled "TIREM/SEM Handbook" dated March, 1994, chapter 5 "Model Limitations," page 5-5 incorporated herein by reference as if fully set forth. According to the Handbook, TIREM's mean calculated RF propagation loss is −0.6 dB with a standard deviation of 10.5 dB. The TIREM model is static, however, and does not adequately account for changes in RF signal and noise conditions, resulting in miscalculation of RF link propagation losses.

While one could attempt to refine the model in order to account for various propagation conditions, the possible combinations are simply too numerous. Rather than attempting to improve the model, the present invention performs a statistical analysis of all the model parameters required to calculate the EPLRS S/N ratio, then identifies the parameters that have the most inaccuracies, making those parameters the limiting factor during subsequent calculations. For example, the present invention accounts for the inaccuracy contained in the TIREM mean value, by using a process that provides a margin based on random variables and the normal distribution function. This margin provides a stressing factor to the mean calculation of S/N which allows for a higher confidence that the model will represent the real world by a certain percentage of time. Another example is the RF noise background used for the noise calculation, which is separate from the broadband jamming noise. Reference is made to ITT textbook entitled "Reference Data For Radio Engineers" fifth edition (October, 1968) page 27-2 FIG. 1 "Median Values of Average Noise Power from Various Sources," incorporated herein by reference as if fully set forth. These values are assumed values that can be used as stress factors when calculating the N in the S/N ratio.

OBJECTS AND SUMMARY OF THE INVENTION

It is an object of the present invention to provide an improved method of PCOM analysis and of determining RF propagation loss in an EPLRS or similar communication system. These and other objects are satisfied, at least in part by a method for optimizing an EPLRS RF communications network for use in a battlefield environment which includes determining a statistical difference between a mean propagation loss for an EPLRS RF link based on measured RF propagation loss and TIREM calculated mean RF propagation loss, establishing a margin of error based on the statistical difference to arrive at a confidence level of the RF propagation loss, determining a computed S/N value based on the confidence level for the benign and jamming case. Still other objects of the present invention will become readily apparent to those skilled in this art from the following description wherein, where there is shown and described a preferred embodiment of this invention, simply by way of illustration one of the modes to best carry out the invention. As it will be realized, the invention is capable of other different embodiments and its several details are capable of modification in various, obvious aspects all without departing from the invention. Accordingly, the drawings and descriptions will be regarded as illustrative in nature and not restrictive.

DETAILED DESCRIPTION OF INVENTION

The EPLRS Probability of Communication (PCOM) analysis tool defines a set of processes that are used to determine each EPLRS RF link performance. This performance is based a various statistical algorithms which determine the PCOM of a single EPLRS pulse over a single RF link in one direction. This PCOM is a function of the S/N ratio described above. The flow charts describing the processes are contained in FIG. 1 "Calculating PCOM From An S/N Value, For Non-Jamming Case" and FIG. 2 "Calculating PCOM From An S/N Value, For Broadband Jamming Case." There are three major functions that can be characterized by statistical algorithms, namely:

RF propagation loss;
Total environment noise (other then jamming); and
PCOM value generated for each of the four EPLRS modes of operation, given the noise value with, and without, jamming.

Figure 1:
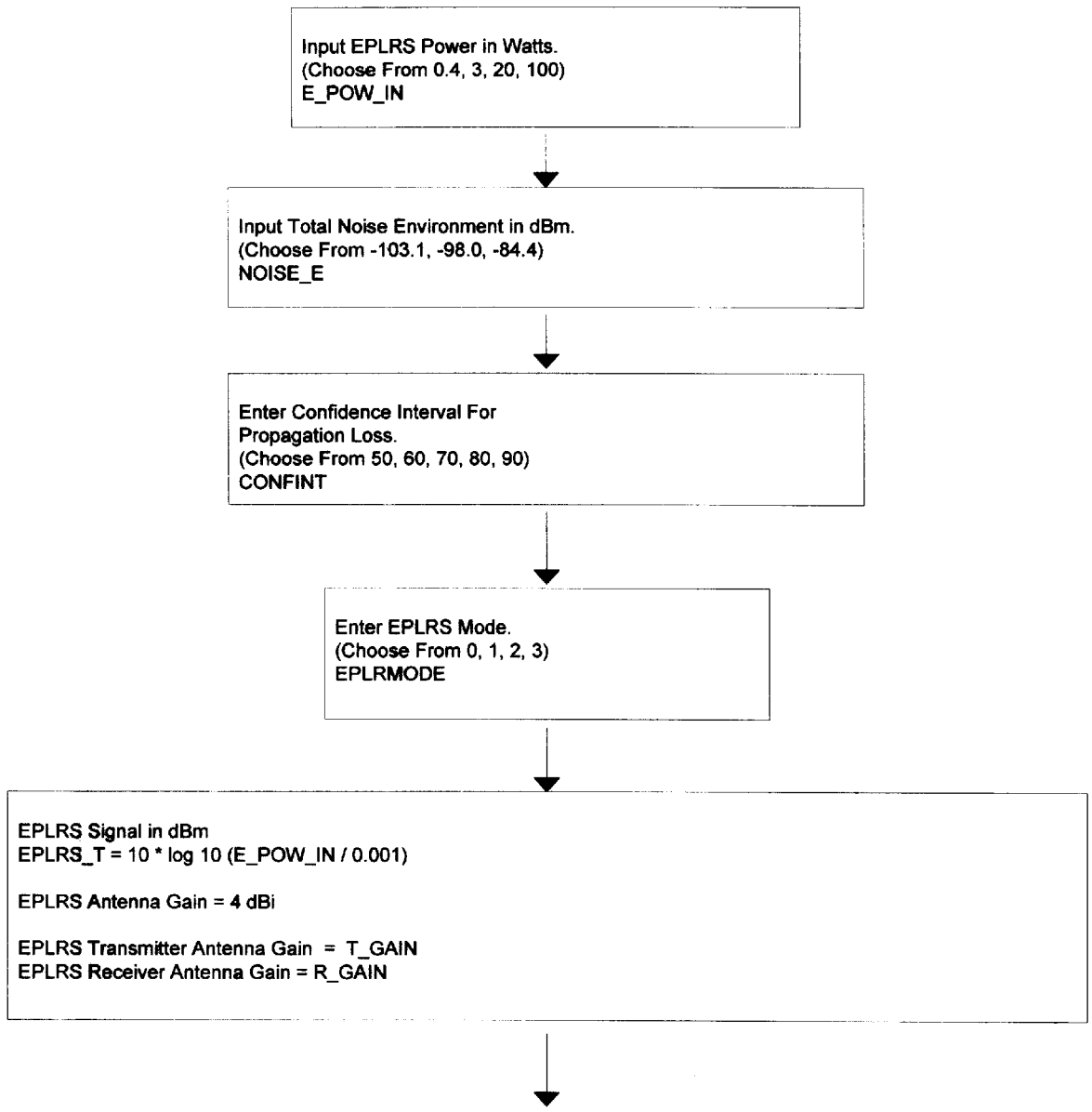
FIG. 1 depicts a flow charts describing programming for carrying out the invention for the non-jamming case.

FIG. 1, sets forth a preferred embodiment for calculating PCOM From S/N Value, For Non-Jamming Case and describes the basic algorithms for calculating a PCOM given the following inputs:
  a. EPLRS power in watts (EPLRS_T), there are 4 power levels for EPLRS namely 100, 20, 3 or 0.4 watts.
  b. Total noise environment (NOISE_E) see "Detailed Description Of Invention" main paragraph and "Total Noise Environment (other then broadband jammer) sub paragraph. Choose from:
    i. Rural case (Galactic)=−103.1 dBm
    ii. Suburban case=−98.0 dBm
    iii. Urban case=−84.4 dBm
  c. Propagation loss confidence interval, choose from: 50, 60, 70, 80, or 90% (CONFINT).

From the confidence interval one can determine a Z number which can be determined from "Cumulative Probabilities Of The Normal Probability Distribution Table" see "Detailed Description Of Invention" main paragraph and "RF Propagation Loss" sub paragraph.

For CONFINT=50, CONF_Z=0.
CONFINT=60, CONF_Z=0.25
CONFINT=70, CONF_Z=0.52
CONFINT=80, CONF_Z=0.84
CONFINT=90, CONF_Z=1.28

Note when calculating the S value, the margin value is added to the TIREM propagation loss calculation for the EPLRS link.
  d. EPLRS Mode of operation (EPLRMODE), choose from 0,1,2,3. For EPLRSMODE=0, E/N=S/N+Factor for Mode 0 EPLRSMODE=1, E/N=S/N+Factor for Mode 1 EPLRSMODE=2, E/N=S/N+Factor for Mode 2 EPLRSMODE=3, E/N=S/N+Factor for Mode 3

Note E=EPLRS desired signal at the encoded bit level.
Given the values for E/N above, one can calculate a PCOM value for that single link in the non-jamming case with a certain level of confidence.

Figure 2:
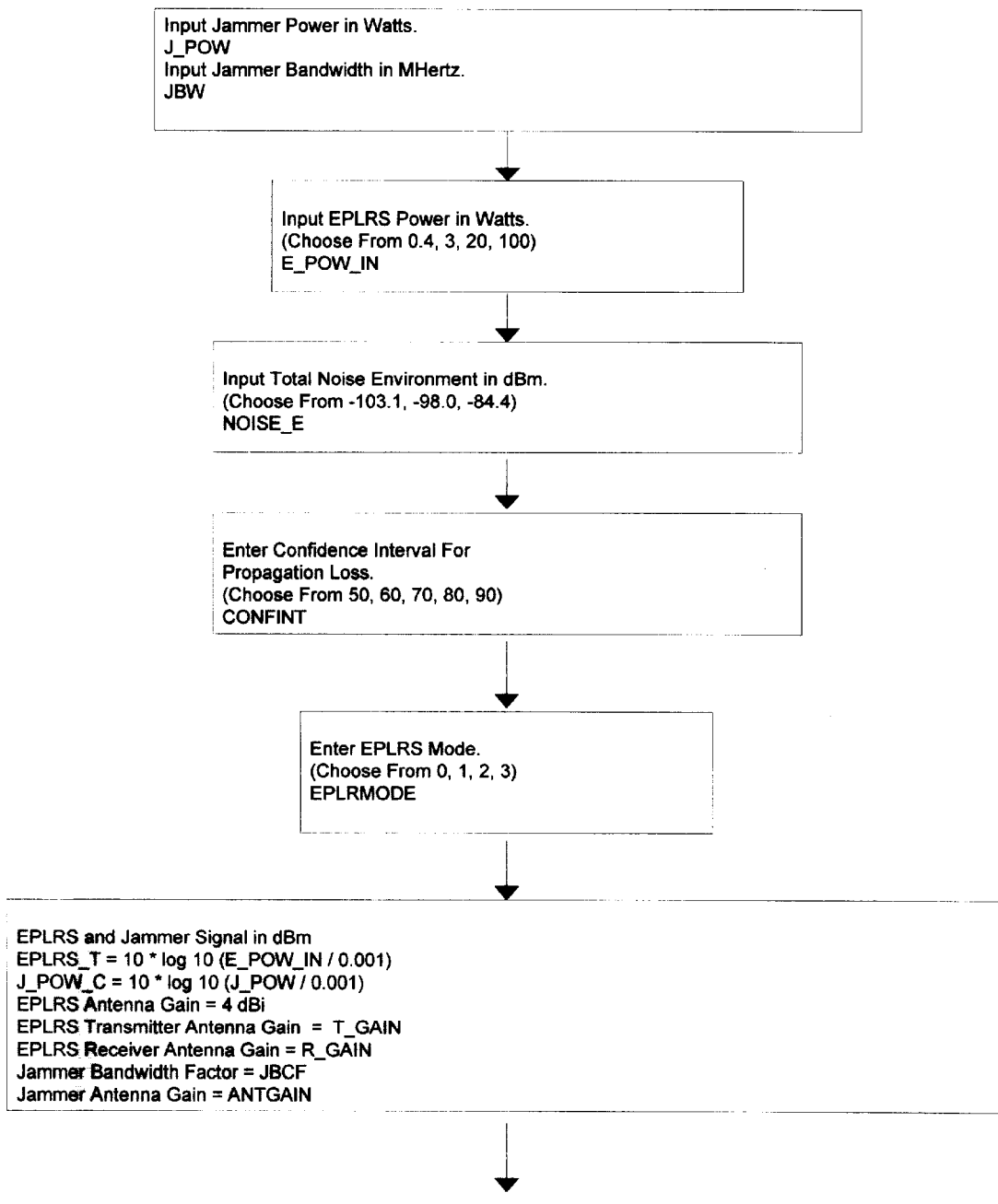
FIG. 2 depicts a flow charts describing programming for carrying out the invention for the jamming case.

FIG. 2 sets forth a preferred method for calculating PCOM From S/N Value, For Broadband Jamming Case and describes the basic algorithms for calculating a PCOM given the following inputs:
  a. Broadband Jammer power in watts (J_POW)
  b. Broadband Jammer Bandwidth (JBW)
  c. EPLRS power in watts (EPLRS_T), there are 4 power levels for EPLRS namely 100, 20, 3 or 0.4 watts.
  d. Total noise environment (NOISE_E) see "Detailed Description Of Invention" main paragraph and "Total Noise Environment (other then broadband jammer) sub paragraph. Choose from:
    (1) Rural case (Galactic)=−103.1 dBm
    (2) Suburban case=−98.0 dBm
    (3) Urban case=−84.4 dBm
  e. Propagation loss confidence interval, choose from: 50, 60, 70, 80, or 90% (CONFINT).

From the confidence interval one can determine a Z number which can be determined from "Cumulative Probabilities Of The Normal Probability Distribution Table" see "Detailed Description Of Invention" main paragraph and "Broadband Jamming Case" sub paragraph.

For CONFINT=50, CONF_Z=0.0
CONFINT=60, CONF_Z=0.25
CONFINT=70, CONF_Z=0.52
CONFINT=80, CONF_Z 0.84
CONFINT=90, CONF_Z=1.28

Note when calculating S/N, TIREM propagation loss calculation is used directly for the desired EPLRS and Jammer links, without applying margins. The margin which is calculated is subtracted from S/N calculation above.
  f. EPLRS Mode of operation (EPLRMODE), choose from 0,1,2,3. For EPLRSMODE=0, E/N=S/N+Factor for Mode 0 EPLRSMODE=1, E/N=S/N+Factor for Mode 1 EPLRSMODE=2, E/N=S/N+Factor for Mode 2 EPLRSMODE=3, E/N=S/N+Factor for Mode 3

Note E=EPLRS desired signal at the encoded bit level.
Given the values specified in paragraph for E/N above, one can calculate a PCOM value for that single link in the jamming case with a certain level of confidence.

RF Propagation Loss

Through field experiments it has been determined that the difference between measured RF propagation loss and TIREM calculated mean propagation loss, follows a normal distribution when the sample size is very large (4000 sample points for example). For the non-jamming (benign) case, when calculating the ratio of the received desired signal (S) to total noise at the receiver (N), the total noise is an estimated mean noise, and the desired signal is computed using TIREM. The assumption made in this analysis is that the total noise standard deviation (SD) is less than TIREM's SD. The following example illustrates the statistical approach of the present invention to computing propagation loss value with some confidence value:

$$P(X < X\text{upper}) = 0.80$$

In this example, we determine a propagation loss value Xupper, given the probability that the random variable X will be less than Xupper 80% of the time. For background, see "Quality Control And Industrial Statistics" by Duncan, page 89–91 Normal Distribution page 945, Table for Cumulative Probabilities Of The Normal Probability Distributions.

$$Z = (X\text{ upper} - X\text{ mean})/SD$$

X mean=mean propagation loss calculation from TREM between Measured RF propagation loss and TLREM calculated mean RF.
SD=Standard Deviation for TREM model based on the difference in propagation loss, for TIREM SD=+/−10.5.

For background, see ECAC-HDBK-93-076 Titled—"TIREM (Terrain-Integrated Rough-Earth Model)/SEM (Spherical Earth Model) Handbook" page 5-5, for SD value above. Z from above table for 0.80=0.84. Note the Z value is from minus infinity to a value of Z above the mean, which makes Z plus.

$Z = (X \text{ upper} - X \text{ mean})/10.5 \text{ dB}$ $X \text{ upper} = (10.5 \text{ dB} * 0.84) + X \text{ mean}.$ Therefore the margin for the benign case for 80% confidence=(10.5 DB*0.84) is approximately 8.8 dB. The 8.8 dB would be added to the mean propagation loss value computed by TIREM, in order to determine a computed value of propagation loss which, when compared to the real world, would not be exceeded 80% of the time.

Total Noise Environment (Other Then the Broadband Jammer)

Median values from various noise sources can be obtained from any number of readily available reference texts. See, e.g., the ITT text book titled "Reference Data for Radio Engineers" fifth edition, page 27-2 FIG. 1, "Median values of average noise power from various sources," incorporated herein by reference. Using this chart we calculate values for the total noise environment which is equal to 10*log 10^((internal noise/10)+10^(external noise/10)). The internal noise=kBT noise plus the noise figure of the radio. kBT=k (Boltzmann constant)*B (bandwidth of EPLRS receiver)*T (290 degrees Kelvin room temperature). The noise figure for EPLRS is 6 dB above kBT noise. The external noise is taken from the above table:

Galactic (equivalent to rural noise) noise

Man-Made Suburban and Urban noises.

The ITT median values of average noise power can be used to determine the Total Noise Environment to compute this value. The following values can be used as stressing factors when computing N in the S/N ratio:

Rural case (Galactic)=−103.1 dBm
Suburban case=−98.0 dBm
Urban case=−84.4 dBm

Broadband Jamming Case

For the jamming case S/N, the N value=10*Log(10^(N/10)+10^(J/10)) where the jammer's strength at the receiver (J) is calculated using TIREM. This problem involves two random variables which are subtracted in the S/N ratio. The J and S values are both affected by TIREM's propagation loss calculations when calculating S/N. See, "Probabilistic Approaches to Design" by Haugen, page 123, Algebra of Normal Functions for subtraction (S−N) and the sample problem on page 115 and 116. The mean (S−N)=mean S−mean N and standard deviation (SD) for the independent case is SD (S−N)=square root of (SD (S) ^2+SD (N) ^2). For the correlated case SD (S−N)=square root of (SD S ^2+SD Y ^2−(2*r*SD (S)*SD (N))) where "r" is the correlation coefficient. In this analysis, the assumption is that S and J are independent variables, which is viewed as the worst case, since the correlation between the S and J calculations is not known. The S/N calculation would assume a mean total noise value with no known SD, so the TIREM mean calculation would apply to both the S and J calculation. The assumption in this analysis is the total noise SD is less the that of TIREM's SD. Therefore to calculate a mean S/N, using TIREM's propagation loss calculation, the SD would be square root (SD (S) ^2+SD (J) ^2). For TIREM there are SDs for Line Of Sight, Diffraction and Troposcatter, the overall SD=10.5. In order to have a 70% confidence that the a calculated S/N value with some margin, will represent at least 70% of the real world measurements, yields S/N lower−S/N mean/SD=−Z. The above is expressed as P (S/N lower>S/N)=0.7 or the P (S/N<S/N lower)=0.3. Note the Z value used here is negative. For example if the mean S/N=10 dB and SD for S/N=square root (10.5 ^2+10.5 ^2)=14.8, for 70% confidence Z=−0.52, therefore S/N lower=10 dB mean−(14.8*0.52). The value 14.8*0.52 results in a 7.7 dB margin which gets subtracted from the calculated S/N. For this example the new value of S/N=10−7.7=2.3 dB. This margin provides a 70% confidence that the mean calculated S/N minus above margin, which results in the value of 2.3 dB, will be exceeded by 70% of real world measurements for S/N.

Having thus shown and described what are at present considered to be preferred embodiment of the present invention, it should be noted that the same have been made by way of illustration and not limitation. Accordingly, all modifications, alterations and changes coming within the spirit and scope of the present invention are herein meant to be included.

I claim:

1. A method for optimizing an RF communications network for use in a battlefield environment, comprising:

a. determining a statistical difference between a mean propagation loss for an RF link based on measured RF propagation loss and Terrain-Integrated Rough-Model calculated RF propagation loss;

b. establishing a margin of error based on said statistical difference to arrive at a confidence level of the RF propagation loss;

c. determining a computed S/N based on said confidence level of the RF propagation loss, for situations in which there is no jamming of said RF communications network;

d. determining a Probability of Communication value based on the computed S/N value; and e. determining an RF link performance level from said Probability of Communication value.

2. A method for optimizing an RF communications network for use in a battlefield environment, comprising:

a. determining a statistical difference between a mean propagation loss for an RF link based on measured RF propagation loss and Terrain-Integrated Rough-Model calculated RF propagation loss;

b. establishing a margin of error based on said statistical difference to arrive at a confidence level of the RF propagation loss;

c. determining a computed S/N based on said confidence level of the RF propagation loss, for situations in which there is no jamming of said RF communications network case; and d. determining a Probability of Communication value based on the computed S/N value; and e. determining an RF link performance level from said Probability of Communication value.

* * * * *